(12) United States Patent
Jung et al.

(10) Patent No.: US 7,996,352 B2
(45) Date of Patent: Aug. 9, 2011

(54) DISTRIBUTED RULE PROCESSING FOR UBIQUITOUS COMPUTING ENVIRONMENTS

(75) Inventors: WooChul Jung, Seoul (KR); DaeRyung Lee, Seoul (KR); Stella J. Mitchell, Pleasantville, NY (US); Jonathan Munson, Putnam Valley, NY (US); Moonju Park, Seoul (KR); David A. Wood, Scarsdale, NY (US)

(73) Assignees: International Business Machines Corporation, Armonk, NY (US); Institute for Information Technology Advancement, Daejeon (CN)

( * ) Notice: Subject to any disclaimer, the term of this patent is extended or adjusted under 35 U.S.C. 154(b) by 680 days.

(21) Appl. No.: 12/130,416

(22) Filed: May 30, 2008

(65) Prior Publication Data
US 2009/0299939 A1  Dec. 3, 2009

(51) Int. Cl.
*G06N 5/00* (2006.01)
(52) U.S. Cl. .............................. 706/47; 706/45
(58) Field of Classification Search .................. 706/47, 706/45
See application file for complete search history.

(56) References Cited

OTHER PUBLICATIONS

Alippi, et al, Just-in-Time Adaptive Classifiers—Part I: Detecting Nonstationary Changes, IEEE Transactions on Neural Networks, vol. 19, No. 7, Jul. 2008, pp. 1145-1153.*
Adi et al., "AMiT—The situation manager", International Journal on Very Large Data Bases 13(2):177-203, (2004).
Amini et al., "Adaptive control of extreme-scale stream processing systems", In proceedings of the International Conference on Distributed Computing Systems, p. 71 (2006).
Bernat et al., "Portable worst-case execution time analysis using Java byte code", In proceedings of 12th Euromicro Conference on Real-Time Systems. pp. 81-88, Jun. 2000.
Boulis et al., "Design and Implementation of a framework for efficient and programmable sensor networks", In proceedings of the First International Conference onMobile Systems, Applications, and Services, pp. 187-200, May 2008.
Cabitza et al., "DJess—A context-sharing middleware to deploy distributed inferences systems in pervasive computing domains", In proceedings of International Conference on Pervasive Services, pp. 229-238, Jul. 2005.
Engblom et al., "Worst-case execution-time analysis for embedded real-time systems", International Journal on Software Tools for Technology Transfer, 4(4):437-455, (2003).

(Continued)

*Primary Examiner* — Wilbert L Starks, Jr.
(74) *Attorney, Agent, or Firm* — Ryan, Mason & Lewis, LLP

(57) ABSTRACT

Methods and apparatus are provided for distributed rule processing in a sense and respond system. A method for identifying a candidate set of rules is disclosed, comprising the steps of: identifying one or more rules that receive information from one or more sensors to create a first candidate set of rules; evaluating each of the identified rules to identify an initial candidate set of rules, wherein a rule is added to the initial candidate set if a selected device is associated with sensors that are enabled to produce information for the rule being evaluated, if the selected device is enabled to locally provide input information required by the rule being evaluated, and if the rule being evaluated is associated with a group of devices and there are no correlation operators that consume events generated from other devices in the group of devices; and evaluating each rule in the initial candidate set to identify a final candidate set of rules, wherein any rule that receives information from the rule being evaluated is added to the initial candidate set to create the final candidate set if the selected device is enabled to locally satisfy input information required by the rule that receives information and if the rule that receives information is associated with a group of devices and there are no correlation operators that consume events generated from other devices in the group of devices.

19 Claims, 7 Drawing Sheets

OTHER PUBLICATIONS

Jess—the Java Expert System Shell. http://herzberg.ca.sandia.gov/jess/.

Jung et al., "An event detection service for spatio-temporal applications", In proceedings of International Symposium on Web and Wireles Geographical Information Systems, pp. 22-30, Dec. 2006.

Kim et al., "Services-oriented computing in a ubiquitous computing platform", In proceedings of 4th International Conference on Service Oriented Computing 2006.

Levis et al., "Active Sensor Networks", In proceedings of the 2nd USENIX/ACM Symposium on Networked Systems Design and Implementation, pp. 343-356, May 2005.

Liu et al., "DIOS++: A Framework for rule-based autonomic management of distributed scientific applications", Lecture Notes in Computer Science, vol. 2790, Euro-Par 2003 Parallel Processing, pp. 66-73, 2003.

Madden et al., "Tinydb: An acquisitional query processing system for sensor networks", Transactions on Database Systems 30(1):122-173, 2005.

Nagl et al., "ViDRE—A Distributed Service-oriented business rule engine based on RuleML", In proceedings of the 10th IEEE International Enterprise Distributed Object Computing Conference, pp. 35-44, Oct. 2006.

Welsh et al., "Programming sensor networks with abstract regions", In the 1st USENIX/ACM Symposium on Network Systems Design and Implementation, pp. 29-42, Mar. 2004.

Xing et al., "Dynamic load distribution in the Borealis stream processor", In proceedings of 21st International Conference on Data Engineering, pp. 791-802, Apr. 2005.

\* cited by examiner

100

300

400

600

700

DISTRIBUTED RULE PROCESSING FOR UBIQUITOUS COMPUTING ENVIRONMENTS

FIELD OF THE INVENTION

The present invention is related to sense-response technology.

BACKGROUND OF THE INVENTION

With the advent of low-cost sensor technology, low-power computing technology, and widely-available wireless networks, there is an increasing opportunity to sense the physical world, analyze multiple parameters of the physical world, and respond rapidly to changes within the physical world. Businesses would like to capitalize on these capabilities, but their ability to do so has been limited by the inherent complexities of the various systems required to acquire data, deliver data to the appropriate processing nodes, filter out unneeded data, correlate relevant data with other information, and determine if a condition or event of interest has occurred.

Additional challenges arise when the data needed to determine if a condition has occurred is large in volume or required at a high frequency. The data can overload wireless networks or cause substantial network usage charges to be incurred. Furthermore, the computing power required from servers to handle the processing and communication loads may be prohibitively expensive.

In addition, a sense-response application may require an immediate, local response. The traditional model of sending data to business logic executing on servers, computing the response, and then communicating results back to a local agent may result in unsatisfactory delays.

A useful approach to these challenges is to deploy processing capability near the source of the data, co-located with sensor technology. (Such devices are commonly referred to as "motes.") When complex business needs involve heterogeneous sets of devices and diverse sensor technology, however, programming this form of sense-response technology can be challenging.

A need therefore exists for a sense-response programming model where developers can define the conditions of interest as linked sets of rules, and where a framework intelligently deploys the rules to locations where they are most relevant.

SUMMARY OF THE INVENTION

Generally, methods and apparatus are provided for distributed rule processing in a sense and respond system. According to one aspect of the invention, a method for identifying a candidate set of rules comprises the steps of: identifying one or more rules that receive information from one or more sensors to create a first candidate set of rules; evaluating each of the identified rules to identify an initial candidate set of rules, wherein a rule is added to the initial candidate set if a selected device is associated with sensors that are enabled to produce information for the rule being evaluated, if the selected device is enabled to locally provide input information required by the rule being evaluated, and if the rule being evaluated is associated with a group of devices and there are no correlation operators that consume events generated from other devices in the group of devices; and evaluating each rule in the initial candidate set to identify a final candidate set of rules, wherein any rule that receives information from the rule being evaluated is added to the initial candidate set to create the final candidate set if the selected device is enabled to locally satisfy input information required by the rule that receives information and if the rule that receives information is associated with a group of devices and there are no correlation operators that consume events generated from other devices in the group of devices.

According to another aspect of the invention, a method for deactivating one or more rules on a device for a period of time comprises the steps of: estimating one or more ranges of values that will be input to a rule during the finite period of time; evaluating a rule over at least one of the ranges of values, the evaluation yielding a probability distribution over the values; and deactivating the evaluated rule if the evaluation is false over the range of values.

A more complete understanding of the present invention, as well as further features and advantages of the present invention, will be obtained by reference to the following detailed description and drawings.

DETAILED DESCRIPTION

Figure 1:
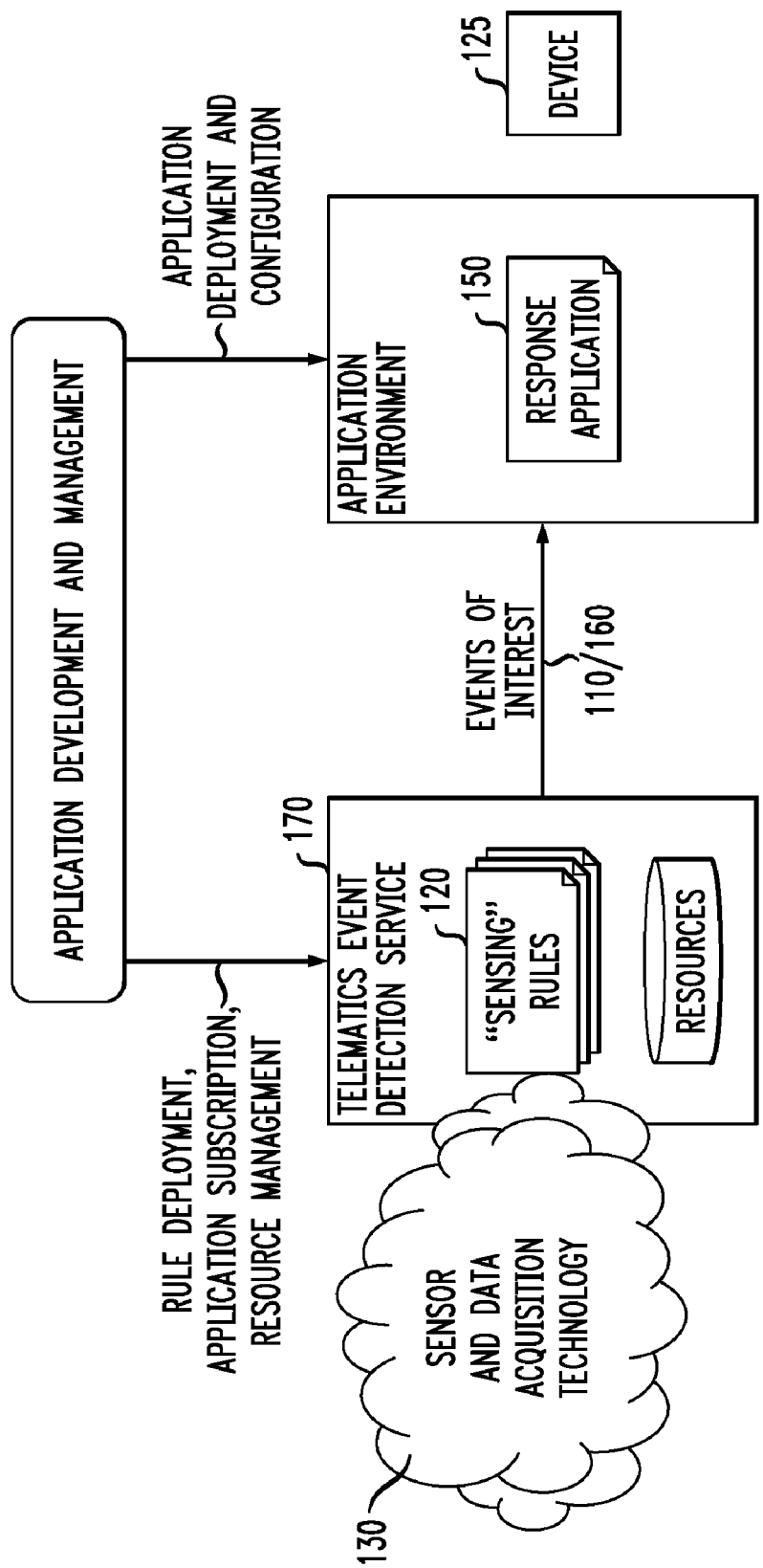
FIG. 1 is an exemplary embodiment of a conventional centralized STEDE system.

An important class of mobile-computing applications involves sensing conditions in a mobile user's physical context and responding to those conditions, perhaps in real time. This class of applications is conventionally known as "sense and respond." Examples of sense and respond systems are found in various domains, including mobile commerce, fleet logistics, and asset and personnel tracking.

The Spatio-Temporal Event Detection Environment (STEDE) offers a rule-based programming model in which the application is partitioned in two parts: (1) a set of rules that operate on low-level input events and which, when triggered, produce high-level, application-defined events; and (2) logic that acts on the high-level events, which is deployed outside STEDE, and typically within the environment of the enterprise deploying the rule. For a detailed description of a Spatio-Temporal Event Detection Environment, see, for example, Jung, W. C, Lee, D. R., Lee, W. I., Mitchell, S., Munson, J. P., An Event-Detection Service for Spatio-Temporal Applications, In Proceedings 6th International Symposium on Web and Wireless Geographical Information Systems, Dec. 4-5, 2006, Hong Kong, China, incorporated by reference herein.

In one aspect of the present invention, a programming framework is disclosed wherein programmers represent conditions of interest in the form of a set of rules. Each rule processes inputs received from sensors or from the output(s) of other rule(s), or both. Programmers form rule sets based on logical decomposition of computation, similar to the decomposition of a program into classes and/or procedures. Rules include boolean expressions composed of input-type specific operators (e.g., spatial operators), as well as the standard logical and relational operators. Rules may also include event correlation primitives. It is not necessary to specify what form of logic rules take. The present framework allows a rule to refer to framework-managed external resources, such as spatial data or attributes of the entities supplying inputs (e.g., a truck's gross weight). Rules may also reference external services.

In another aspect of the present invention, rules refer to inputs as attributes of entities (e.g., a truck, a person, or some other device). Rules may also refer to inputs of entity groups. An entity group is an arbitrary set of entities, with an identifier that allows it to be referred to by rules. At rule subscription time, this is the same as creating a subscription for each entity member of the group. Groups are long-lived constructs, and so as group members are added and removed, rule subscriptions are correspondingly added and removed.

A rule set is deployed on a system of rule evaluation nodes. Nodes may be dedicated to one entity or may process inputs from large numbers of entities. The system accepts subscriptions to the rule sets and deploys the rule(s) in the system, which involves arranging for the necessary rule-input or rule-output data to be delivered to the rule evaluation node hosting the rule, arranging for the necessary rule resources to be available at the rule evaluation node hosting the rule, and delivering the rule's outputs to those rules requiring them. This is performed automatically; the programmer does not need to be aware of the physical characteristics of the rule-processing network.

In one exemplary embodiment of the present invention, a system consists of embedded nodes, which are located close to sensors and close to the users of the devices hosting the embedded nodes, and centralized nodes, which are able to acquire the data of large numbers of users and execute on high-powered computing equipment. The users create descriptions of conditions that they are interested in detecting.

Rule sets are partitioned to enable some elements to be evaluated on embedded rule evaluation nodes based on data availability, cost comparison, and function usage. In still another aspect of the present invention, device resources are conserved by intelligently deactivating rules based on an estimated range of device inputs and by replicating only those rule resources to the device that are needed for rule evaluation based on an estimated range of device inputs.

FIG. 1 is an exemplary embodiment of a conventional centralized STEDE system. As shown in FIG. 1, programmers represent events 110 of interest in the form of rules 120, which "trigger" (return true) when the events 110 are detected. Rules 120 operate on both input received from the data acquisition systems 130 as well as data resources provided and managed by the application programmers. An example of an application resource is a geographical polygon describing a warehouse site's area, which would be used in a rule 120 detecting a truck's entrance to the site.

Rules 120 may trigger based on inputs received from the data acquisition systems 130 in the physical world. Rules 120 may use spatial functions (e.g., InPolygon and InProximityOfGroup) and event correlation operators (e.g., event sequences and event counters). Rules 120 may be interconnected, i.e., an output of one rule 120 may be the input to another rule 120. Rules 120 are conventionally downloaded to embedded computers having attached sensors.

Applications 150 subscribe to a rule 120 to receive event notifications 160 of the occurrence of a trigger of the rule 120. The event notification 160 received includes any results that may have been computed in the evaluation of the rule 120. For example, a rule 120 that determines if a mobile entity's position lies within any zones that have a promotion associated with the rule 120 will, if the position is within any such zones, include the set of zones (via identifiers) in the event notification 160 to applications 150 that have subscribed to the rule 120. The subscription also includes event forwarding information so that when a rule 120 evaluates to true (or times out), the event notification 160 can be sent to a business application for processing. As a result of this architecture, the response logic of sense-and-respond applications can be separated from the rules portion 120 of the application. Applications 150 can be updated at any time, in place, by merely replacing, modifying, adding or deleting a rule 120.

The centralized STEDE system 100 performs centralized rule evaluation. In centralized rule evaluation, all data to be involved in detection of a situation must be delivered to the centralized rule evaluation server 170. While this architecture is simple and can be economical in that the functions required by devices 125 at the edge of the centralized STEDE system 100 are principally data acquisition systems 130 and data transmission, it also has the disadvantages that data transmission costs can be significant and that, if a response should be made at the location where the data is generated (e.g., the driver of a truck that is going too fast for its location and conditions must be delivered a warning), the response will be delayed by the time required for the client 125 to send the data to the rule evaluation server 170 and for the rule evaluation server 170 to send the response to the client 125.

Given that many "edge of the network" devices 125 (e.g., telematics devices, "smartphones," and PDAs) have significant processing capabilities, it makes sense to enable certain rules 120 to be evaluated on the devices 125, where the rule input data is collected, and where the response must be delivered. It is advantageous to retain the STEDE programming model, however, which includes hosted rule evaluation, independent provisioning of rule resources and group definitions. Certain challenges exist, however, in retaining the STEDE programming model, including:

1. Rule Distribution: Some rules 120 involve functions over user/device 125 groups or an aggregation of events 110. It is desirable to enable the parts of rules 120 that concern only individual users or devices 125 to be evaluated locally to those users or devices 125, while the remainder of the rule 120 is evaluated at the server 170.

2. Device CPU Conservation: While many devices 125 are capable of rule evaluation, their resources are limited, and so there is a greater concern for conservation of resources than when rules 120 are evaluated centrally. Furthermore, in certain situations, it can be determined that a rule 120 cannot possibly trigger in the near future, given the client's state (e.g., location). In these cases, it is desirable to determine, in a general way, when a rule 120 can be safely deactivated for a certain period of time.

3. Device Memory Conservation: A rule's resources can include very large sets of geometries (e.g., nationwide locations of weighing stations for trucks) that are too big for limited-resource devices 125. It is desirable to have a method for intelligently replicating the rule resources.

System Model

In addressing the first challenge, rule distribution, the primary requirement was preservation of the STEDE programming model of rule-evaluation-as-service, in which the function of rule evaluation is provided by a service that is independent of applications requiring the function. Preserving the STEDE programming model implies that the developer should not have to be overly aware of the characteristics of the centralized STEDE system 100 that will be evaluating the rule 120.

Figure 2:
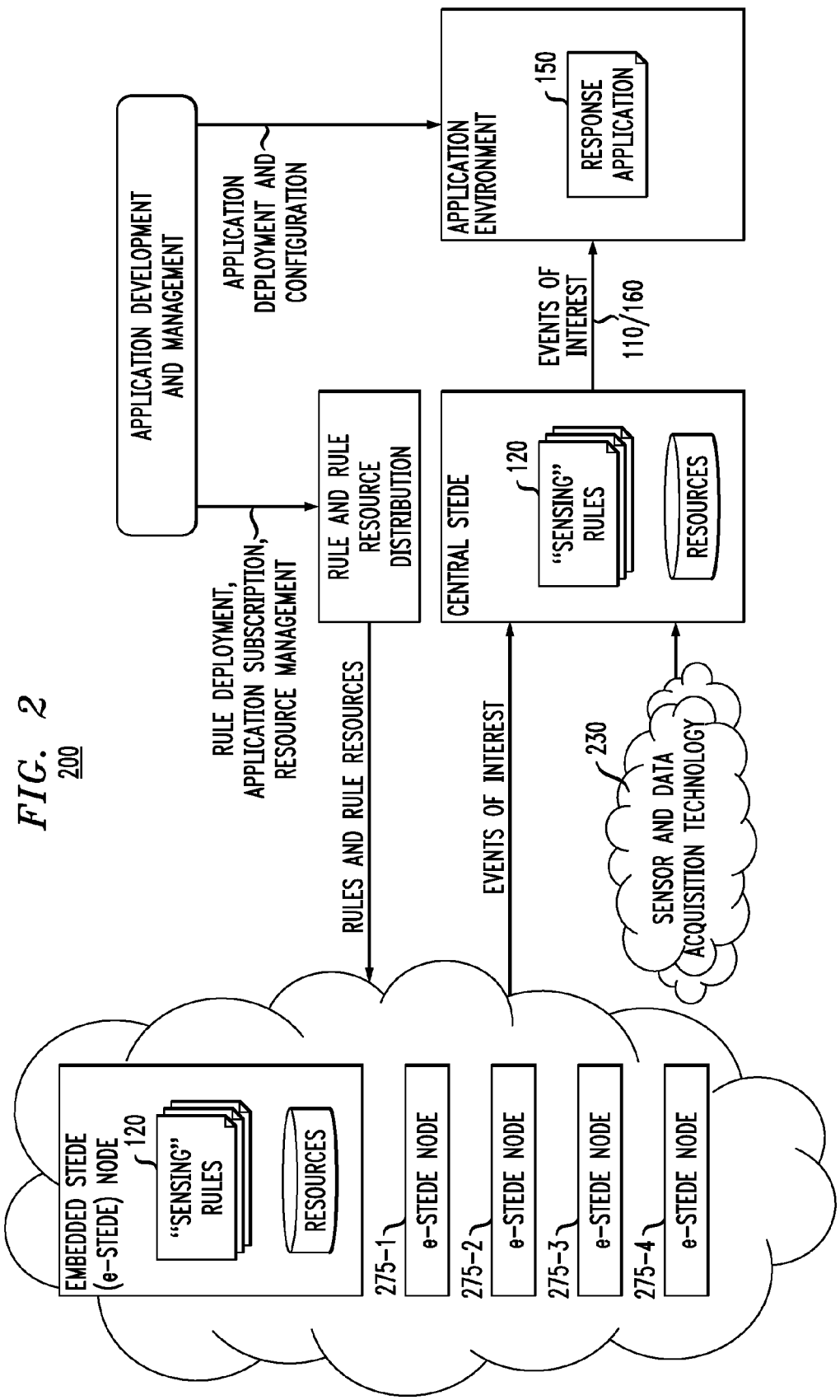
FIG. 2 is a block diagram of the system model of a distributed STEDE system.

FIG. 2 is a block diagram of the system model of a distributed STEDE system 200. In the exemplary conventional embodiment of the centralized STEDE system 100, all elements of a rule 120 are evaluated in a centralized rule evaluation server 170 cluster; there is no distributed system that the programmer need be aware of. In one aspect of the present invention, an approach is disclosed in which the developer decomposes the rule 120 with some knowledge of the characteristics of the distributed STEDE system 200. Given an already decomposed rule 120, STEDE's principal role is then limited to assigning rule elements to evaluation nodes 275. In addition to simplicity, this approach has the advantage of allowing a STEDE system to be flexible with respect to the technology it uses for its rule engine, as no technology-specific decomposition analysis is required.

Figure 3:
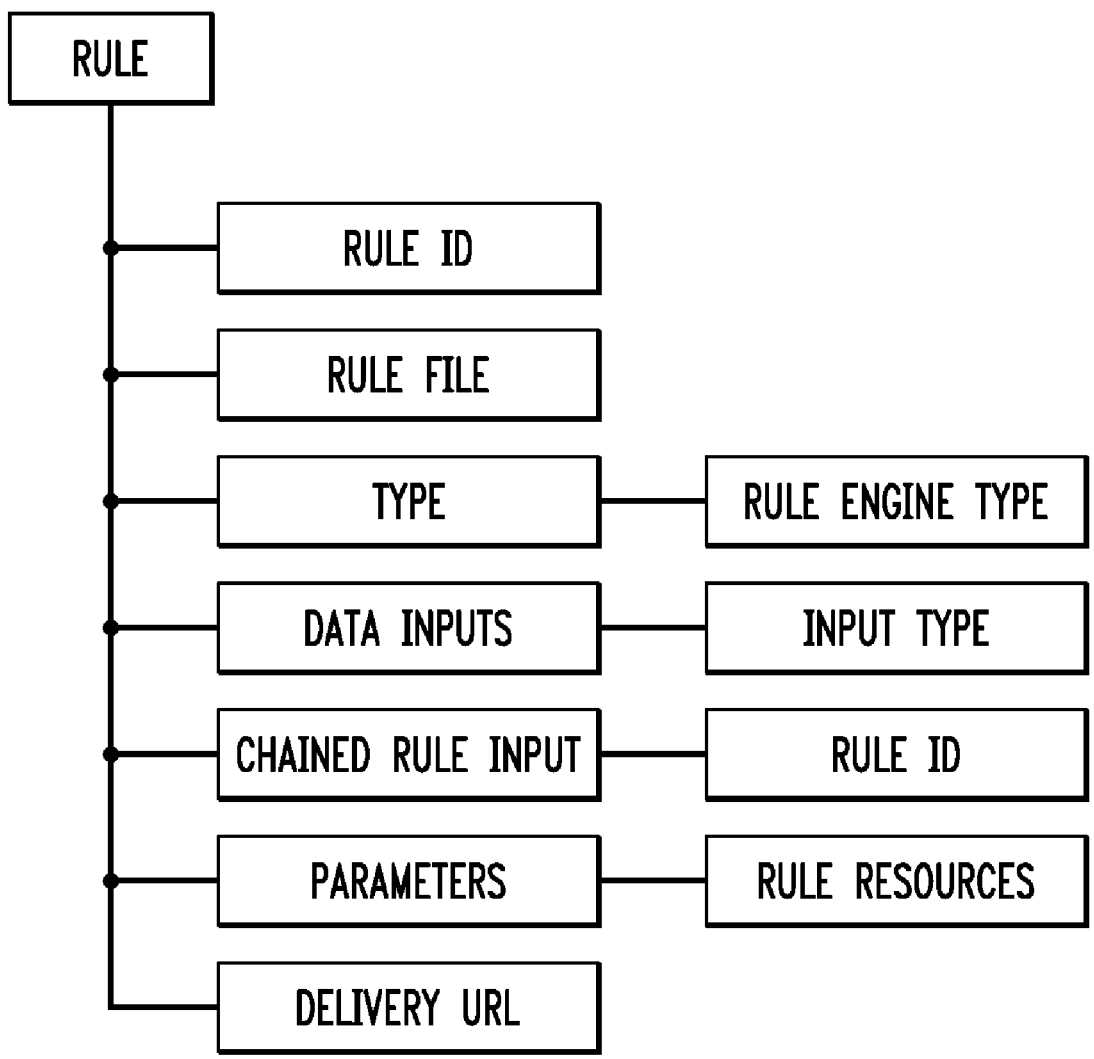
FIG. 3 is an exemplary rule set.

Decomposed rules 120 take the form of a "ruleset." FIG. 3 is an exemplary rule set 300. A ruleset 300 is a set of rules 120 that are linked to each other through explicitly expressed input/output relationships. Rules 120 may receive inputs from data acquisition systems 130, 230 or from the output(s) of other rule(s) 120, or both. Rule outputs may go to other rules (as inputs) or directly to applications 150.

System Description

Figure 4:
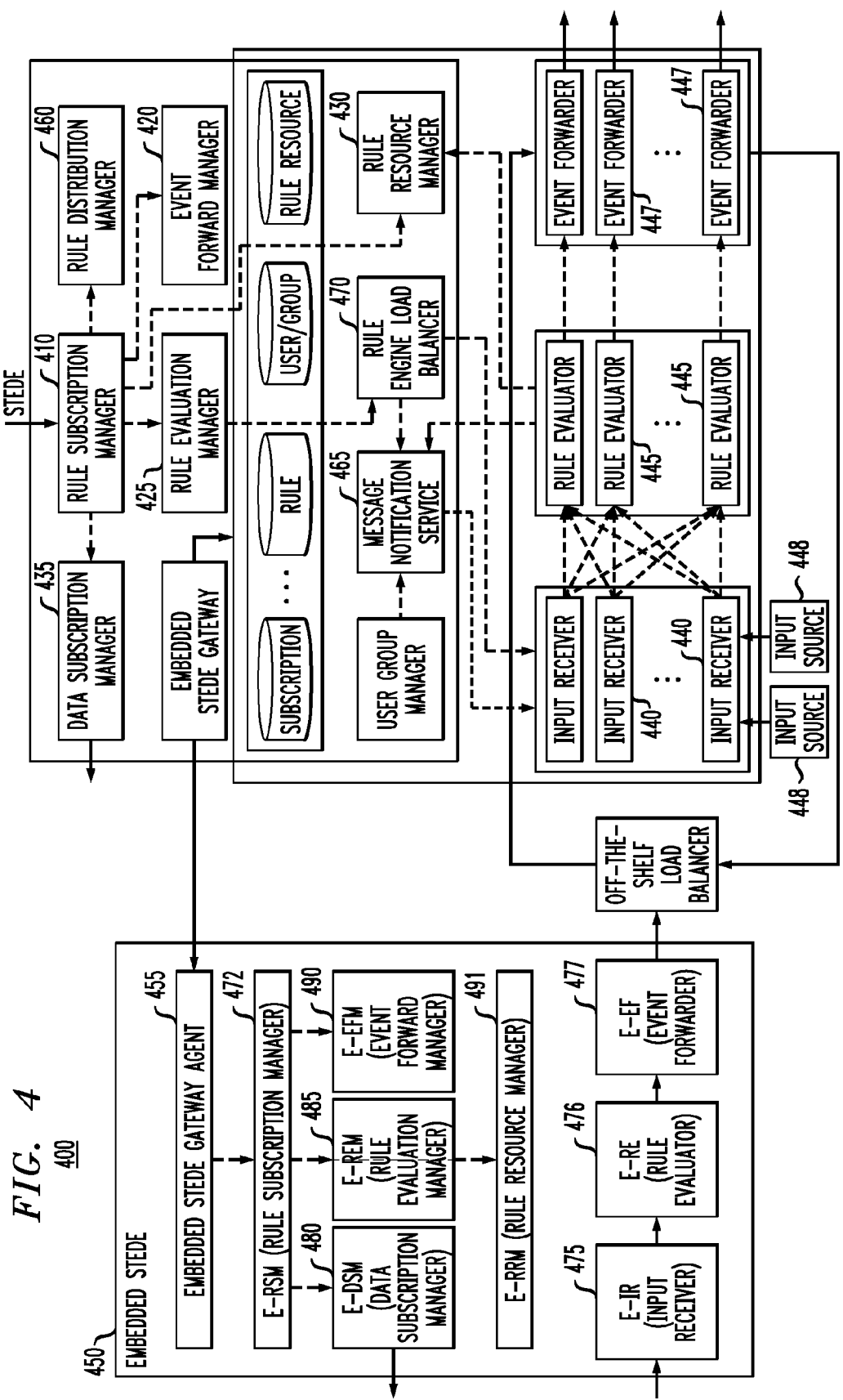
FIG. 4 is a block diagram STEDE system incorporating features of the present invention.

FIG. 4 is a block diagram a distributed STEDE system 400 incorporating features of the present invention. The Rule Subscription Manager (RSM) 410 receives subscription information from the Subscription Set Manager (SSM) (not shown), and distributes information to the Data Acquisition Manager (DAM) (not shown), Event Forward Manager (EFM) 420, Rule Evaluation Manager (REM) 425 and Rule Resource Manager (RRM) 430 for evaluation. RSM 410 is the starting point of the STEDE Runtime System. RSM 410 also manages a Subscriptions database and manages DAM, EFM 420, REM 425 and RRM 430 according to the activation time for each subscription.

The Data Subscription Manager (DSM) 435 manages database tables relating to Input Sources 448, and registers the input data list, which is described in a Subscription-and-Resources (SNR) file, to the Input Source 448.

The Rule Evaluation Manager (REM) 425 manages the information of rules 120 and, according to the activation time list, activates or deactivates a rule 120 in an Input Receiver (IR) 440 and Rule Evaluator (RE) 445.

The Event Forwarding Manager (EFM) 420 delivers notifications of rule(s) 120 triggering events 110.

The Rule Resource Manager (RRM) 430 manages rule resources 120 which are conventionally defined in XML format. There are two pre-defined types of rule resources 120, geographic points and polygons. Additional rule resource types (e.g., circle, rectangle, and road) can be added. RRM 430 also manages user resources, which is a facility to allow the rule programmers to store and retrieve values at runtime.

The Input Receiver (IR) 440 is a data acquisition and event dispatching component. When a new input data event 110 arrives, one or more rules 120 will need to be evaluated. The role of IR 440 is to dispatch the event 110 to the appropriate Rule Evaluator nodes 445 (i.e., the Rule Evaluation node 445 with instances of rules 120 that need to be evaluated). Both the data owner (entity) and the target rule 120 are used to select the Rule Evaluator node 445. The entry point (i.e., the interface to external data sources) of the distributed STEDE system 400 is a queue and queue handling is implemented with a Message Driven Bean (MDB). A distributed STEDE system 400 may be configured with multiple IR's 440. In this case, each IR 440 has identical configuration and functionality. External data sources will be connected to only one IR 440, so each input event 110 in the distributed STEDE system 400 will be handled by only one IR 440. Configuration events sent by the deployment component are sent to all IR's 440.

The Rule Evaluator (RE) 445 is the part of the distributed STEDE system 400 that performs parsing and evaluation of business rules 120 written by application rule developers. The Rule Evaluator 445 has four main parts: Rule Buffer, Rule Pool, Rule Instance and Rule Engine. The Rule Engine is an interface, which allows for plugging in of different rule engine technologies. In the exemplary distributed STEDE system 400, the ABLE rule engine is used to implement the Rule Engine interface. In order to achieve better performance, each Rule Evaluator node 445 maintains a local copy of the Input Buffer. The local input buffers are similar to the shared Input Buffer described above, except that they are maintained in memory instead of in a database table, and local input buffers only contain entries for data items which get routed to the owning node. Rule Evaluator 445 first looks for any data item it needs in its local input buffer, and only if it is not found there does it retrieve the data from the shared Input Buffer. A Rule Instance is an instance of a rule defined over an entity group which serves a single entity. A Rule Pool is a set of these instances which are kept in memory for better performance. A distributed STEDE system 400 may be configured with multiple Rule Evaluator's 445. In this case, each Rule Evaluator 445 is responsible for handling a different set of entity/rule combinations.

The Event Forwarder Manager (EFM) 420 manages the event notifications 160 of triggered rules 120. Business applications 150 subscribe to rules 120 to receive event notifications 160 of their triggering or timing out. Rule subscriptions include an event-forwarding specifier that includes a destination address and a protocol indicator. Supported protocols include the common URL schemes such as http and file, class (for instantiating an application-defined class to handle the event 110), and an interface for supporting extensions. When a rule 120 triggers (evaluates to true), EFM 420 sends an event notification 160 representing the detected situation to the destination specified in the rule subscription. The event notification 160 includes only results that may have been computed in the evaluation of the rule 120. For example, a rule 120 that determines whether a mobile entity's position lies within any zones that have a promotion associated with them may include the set of zones (via identifiers) in the event notification 160 to subscribed applications 150. A distributed STEDE system 400 may be configured with multiple EFMs 420. In this case, each EFM 420 has identical configuration and functionality. A Rule Evaluator 445 can route the notification request to an EFM 440 based on one of a variety of load balancing processes.

The Embedded STEDE Gateway 450 performs embedded STEDE profile management, deploys, updates and deletes rules 120 and rule resources for the embedded STEDE client, and keeps track of the history of embedded rule related operations.

The Rule Distribution Manager (RDM) 460 assigns rules 120 to Rule Evaluator nodes 445, or ranges of RE nodes 445, at subscription deployment time.

The User Group Manager (UGM) 460 manages groups of users. Each user can belong to more than one group, and UGM 460 handles the addition and deletion of users to or from groups. UGM 460 can also create a new group or update, delete, and search an existing group.

Message Notification Service (MNS) 465 is a lightweight component offering a simple publish/subscribe facility. Modules that have events 110 that other modules may be interested in publish the event 110 as a sequence of strings, where the first string identifies the module (like "UGS" or "RELB").

Rule Engine Load Balancer (RELB) 470 assigns entities to Rule Evaluator nodes 445 at runtime, in the case of rules 120 which are installed on multiple Rule Evaluator nodes 445.

Embedded STEDE Gateway Agent (ESGA) nodes 455 are those which receive direct sensor data. ESGA Edge nodes 455 may be deployed in on-board embedded systems, as well as in stationary contexts, such as highway toll collection sites, truck inspection stations, or highway sensor data collection points.

The Embedded Rule Subscription Manager (e-RSM) 472 receives resources from the ESGA 450 and sends appropriate information to the embedded Input Receiver (e-IR) 475, embedded Rule Evaluator (e-RE) 476, and embedded Event Forwarder (e-EF) 477, such as rules 120 for evaluation, types of input data for the rules 120, and URL(s) of the reports when the rule 120 is triggered. Rules 120 are submitted as rule "subscriptions," which include a rule 120, or a reference to an already submitted rule 120, as well as directives about event forwarding. The subscription information is contained in a Subscription Archive (SAR) file and managed by the e-RSM. Upon receiving a rule subscription, the e-RSM 472 conducts the following functions:

1) Analysis of the rule 120 to determine necessary input data.
2) Provision of subscription information for Input Adaptor(s).
3) Deployment of the rule 120 to e-RE 476.
4) Deployment of the rule subscription data to the e-EF 477 (which creates an application event and forwards it to a destination specified by the rule subscription when it receives a rule-triggered event 110 from the e-RE 476).

The Embedded Data Subscription Manager (e-DSM) 480 registers the input data list to the InputSource.

The Embedded Rule Evaluation Manager (e-REM) 485 manages information of rules 120 and, according to the activation time list, it activates or deactivates rule 120 into e-IR 475 and e-RE 476.

The Embedded Event Forwarding Manager (e-EFM) 490 delivers event notifications 160 of rule triggering events 110.

The Embedded Rule Resource Manager (e-RRM) 491 manages rule resources 120, which are external information referred to by rules 120, and user resources, which are a facility to allow programmers to store and retrieve values at runtime.

Embedded Input Receiver (e-IR) 475 receives data from Input Adaptor(s) or e-EF 477, and feeds them into e-RE 476.

Embedded Rule Evaluator (e-RE) 476 manages a set of rules 120 to be evaluated. Upon receiving input data from Embedded Input Receiver 475, e-RE 476 determines the subset of rules 120 requiring the input data and invokes a rule engine to evaluate the subset of rules 120. If a rule 120 'triggers' (returns true), an event notification containing the triggering inputs and any side-effect data computed by the rule 120 are sent to the e-EF 477.

Embedded Event Forwarder (e-EF) 477 receives rule-triggered events from embedded Rule Evaluator 476 and forwards them to a destination as specified by the associated rule subscription. Rule-triggered event notifications may be forwarded to a rule evaluation server 170, or to on-board applications through a Content Push Agent.

Chained Rule Distribution and Evaluation

Rule Subscriptions

There are seven important fields for a rule 120 in a rule sequence:

| | |
|---|---|
| Rule ID | A unique rule identifier. |
| Rule file | Name of the rule file. |
| Type | Type indicates which rule engine will be used for this Rule (the distributed STEDE system is independent of the rule engine). |
| dataInputs | The input type for this rule. |
| chainedRuleInput | Indicates that this rule will be used for the next evaluation of a rule with 'Rule ID.' |
| Parameters | Description of rule resources to evaluate input events. |
| deliveryURL | In the normal rule processing, deliveryURL is the URL of application; in the case of chained rule processing, it is the URL of the next Input Receiver. |

Distribution Protocol

A remote device 125 sends a setup request to a priori known Rule Evaluation Server 170. Its entity ID is already registered to the Rule Evaluation Server 170. In the request, the URL or IP address of the device 125 is included. The Rule Evaluation Server 170 sends a list of rule IDs that device 125 needs. If device 125 has a persistent storage for storing rules 120 and resources, device 125 compares the list of rule IDs with its stored rule IDs, and determines which rules 120 should be downloaded. The rules 120 not in the list are deleted from the file system. The rules 120 in the list, but not found in its persistent storage, are marked missed; otherwise, the comparison procedure is skipped and all the rules 120 in the list are assumed to be missed. The remote device 125 requests the missing rules 120 by sending a request message to the ESGA.

Dynamic Deployment

Deployment of rules 120 or rule resources to a device 125 after the time of device initialization is initiated by the Rule Evaluation Server 170. A (Subscription, rule ID) pair or a (Rule resource, rule ID) pair is pushed to the device 125 using a push mechanism such as the TOPAZ Content Push Service or wireless carrier's Multimedia Messaging Service. The ESGA 450 acknowledges receipt of the subscription/resources through an ACK message to the ESGA 450. For a detailed description of the TOPAZ Content Push Service, see, for example, Kim, J. H., Lee, W. I., Munson, J. P., Tak, Y. J. Services-Oriented Computing in a Ubiquitous Computing Platform, In Proceedings of Fourth International Conference on Service Oriented Computing (ICSOC) 2006, Chicago, December 2006, incorporated by reference herein.

Abnormal Cases

Deployment of Resources for Non-Existent Rule ID

If the embedded STEDE gateway agent 450 gets a resource file for a rule ID which the device 125 does not have, it sends a request for the rule 120 to ESG 455. Upon the request, ESG 455 pushes the (Subscription, rule ID) pair. ESGA 450 does not need to send an acknowledgement (ACK) for the first push because it will be re-sent by ESG 455.

No Response from Device

If the ESGA 450 on the client device 125 does not respond to a message from the ESG 450, the ESG 450 will resend its message after a predetermined period of time. After a predetermined number of attempts, the client is recorded as inactive.

Setup Request from Active Device

Since devices 125 are often powered off without notice, a setup request not in protocol sequence is assumed as a device restart. The Rule Evaluation Server 170 will follow the initial procedure, regardless of the current communication status with the device 125.

The destination address in the rule subscriptions can be the URL of the Input Receiver 440 or the application 150. In the case of normal rule processing, the destination address is that of the application 150, but in the case of chained rule processing, it is the URL of the Input Receiver 440, regardless of whether it is the same system or a different physical system.

Process Flow in Same System

Figure 5:
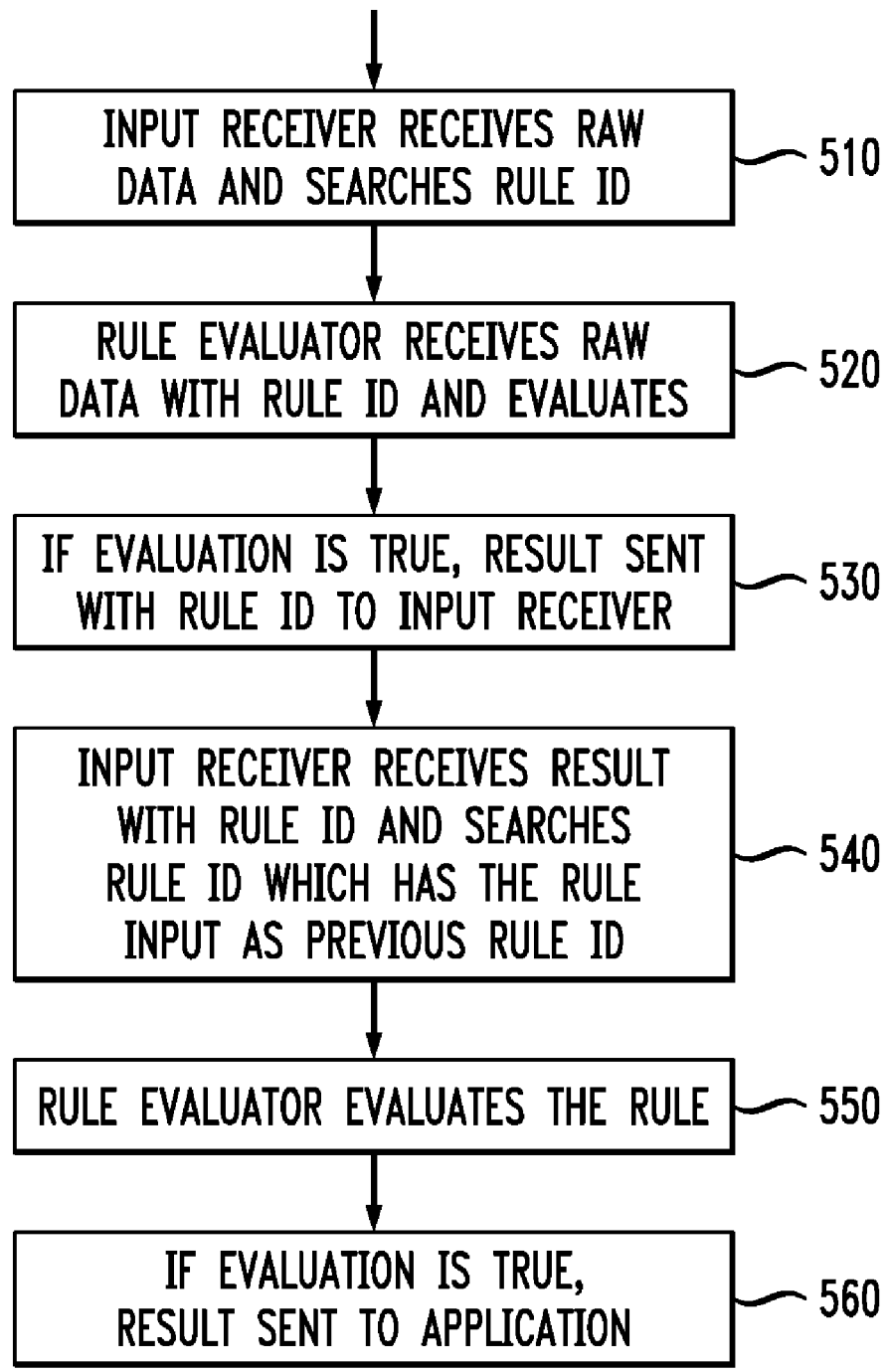
FIG. 5 illustrates the process flow when a chained rule is deployed into the same system.

FIG. 5 illustrates the process flow when a chained rule is deployed into the same system. Input Receiver 440 receives raw data and searches an appropriate Rule ID (step 510). Rule Evaluator 445 gets the raw data with the appropriate Rule ID and evaluates whether it is true (step 520). If the evaluation of the raw data with the appropriate Rule ID is true, Event Forwarder 447 sends the result with the Rule ID to the Input Receiver 440 in the same system (step 530). Next, Input Receiver 440 receives the result with Rule ID, and searches the appropriate Rule ID which has the ruleInput as the previous Rule ID (step 540). Rule Evaluator 445 evaluates the rule 120 (step 550). If the evaluation is true, EFM 420 sends the result to the application 150 (step 560).

In this case, an example of a Rule subscription is:

| Rule-1 | |
|---|---|
| Rule ID | rule1 |
| Rule File | rule1.able |
| Type | ABLE |
| dataInputs | speed, odometer |
| chainedRuleInput | null |
| parameters | ... |
| deliveryURL | the URL of Input Receiver |

| Rule-2 | |
|---|---|
| Rule ID | rule2 |
| Rule File | rule2.able |
| Type | ABLE |
| dataInputs | ... |
| chainedRuleInput | rule1 |
| parameters | ... |
| deliveryURL | the URL of Input Receiver |

Process Flow in Different System

The chained rule can also be used in a different system. For example, a first rule 120 can be evaluated in one system, and a next rule 120 can be evaluated in a different system. In this case, the only difference is the deliveryURL in the first rule 120.

In the above rule example, the deliveryURL in Rule-1 is the URL of the next Input Receiver 440 in a different system.

Automatic Rule Distribution

The determination of whether a rule 120 in a given ruleset 300 can be distributed to an e-STEDE client 125 proceeds in three steps. First, the rule 120 is checked for basic compatibility with the distributed STEDE system 400. Second, the cost of evaluating the rule 120 is estimated. Third, if, based on the evaluation cost estimate, it is determined that the rule 120 cannot be evaluated on the client 125 given the other rules 120 that are currently deployed, the choice of which rule(s) 120 to deploy will be made based on prioritization of the rules 120. This determination is the function of the Rule Distribution Manager (RDM) 460, and the final results are used by the Embedded STEDE Gateway 455 when the distributed STEDE system 400 becomes active.

The three steps are described below. The output of the processes is a ruleset 300 known as the "client ruleset," which is initially empty.

Compatibility with e-STEDE

A rule 120 is compatible with a distributed STEDE system 400 if all of the following conditions hold:

1) The rule 120 receives input data either from the data acquisition systems 130 available on the client 125 or from rules 120 already in the client ruleset;

2) The rule 120 uses only functions and operators available on the client 125, as determined by a configurable table kept by the RDM 460 (functions that are excluded include those that require input from groups of users or devices 125); and 3) The rule 120 uses no correlation operators that can consume events 110 from users or devices 125 in a group.

If a rule 120 is compatible, it is added to the client rule set 300.

Evaluation Cost Estimation

For each rule 120 in the client rule set 300, an estimate is made of the cost of evaluating the rule 120, where cost is a two-part quantity consisting of (1) an expected evaluation time in milliseconds, determined by summing the evaluation times of each of its constituent functions and operators; and (2) a storage requirement measured in bytes, determined by summing the storage requirements of the resources referenced by the rule's 120 functions.

If any rule's 120 cost exceeds, by itself, a pre-determined per-rule budget (optionally specific to a given client 125), the rule 120 is removed from the client rule set 300.

Rule Prioritization

In the model of the distributed STEDE system 400, rulesets 300 of multiple applications 150 are evaluated simultaneously. Thus, in addition to a per-rule cost budget, the RDM 460 imposes a total cost budget for all rules 120 executing on a given device 125. Before a client ruleset 300 is deployed to a device 125, the RDM 460 checks that the total estimated cost of evaluating the client rule set 300, when added to the cost of rulesets 300 already being evaluated on the client 125, does not exceed the budget of the device 125. If the total estimated cost of evaluating the client rule set 300, when added to the cost of rulesets 300 already being evaluated on the client 125, exceeds the budget of the device 125, then a prioritization scheme is used to determine which rules 120 should be evaluated on the device 125:

1) A ruleset's 300 priority is determined through some process outside of the distributed STEDE system 400. For example, it may be determined by a bidding process.

2) Rulesets 300 with priorities lower than the ruleset 300 being deployed are removed from a device 125 until either there are no more such rulesets 300 or until the ruleset 300 being deployed will "fit."

Per-client Rule Activation/Deactivation

The process to determine when a rule 120 on a device 125 should be activated or deactivated is based on estimates of the ranges of the values certain input variables will take over a given future time period. For example, a position input variable may be supported by the process. The process also computes, as a side-effect, the rule-resource geometries that need to be replicated at the client 125 for the given time period.

The process makes use of a data-type extension called a "Range." A range is a probability distribution over a data type, such that any value in the range is equally probable (i.e., the distribution is uniform). Range extensions are defined for the Boolean, Scalar, and Point types. The set of all Boolean Range values is False, True, and False/True, which mean, respectively, that only False is possible, only True is possible, or both False and True are equally possible. Scalar Range values consist of one or more continuous and non-overlapping intervals where the endpoints of each interval are inclusive or exclusive. An example scalar range is 0-10 (both ends inclusive). A Point Range is a set of points, which, in the context of the present invention, is adequately modeled as a continuous region in space (since the positions of physical objects are modeled).

1) For each input to the distributed STEDE system 400, the range an input value will take over a given time period can be estimated (using domain knowledge).

2) The rule language includes several spatial functions. Each function has two signatures: the normal one used for evaluation of the function (e.g., containedInPolygon (Point p, Polygon r)→Boolean where p is the time-varying input and Polygon r is a static value), and another that, for each input in the original signature, takes an input Range. This is called a "reduction" signature (e.g., containedInPolygon(PointRange p, Polygon r)→BooleanRange). For each input type (e.g., Point), there is a range type that represents a probability distribution of values the input may take over a given time period (e.g., PointRange, which is logically a continuous region, but may be conveniently represented as a Polygon). The return type of the reduction signature is the range type of the evaluation signature's return type.

3) The logical operators are extended to operate on the BooleanRange type and return a BooleanRange value according to Table II.

4) The relational operators are extended to operate on the ScalarRange type (the common notion of the number-line range). The definitions of the operators are given in Table III.

At a frequency significantly lower than the evaluation frequency of the rule 120, the rule's reduced condition expression is evaluated as above, using estimated ranges of the rule's inputs for the future time period, based on the current values and domain knowledge of the inputs. For example, to estimate the range of an entity's position within the next 10 minutes, a reasonable maximum speed may be used. The reduced condition expression will return a BooleanRange value (True, False, or False/True). If False, the rule 120 will be deactivated, or if already inactive, will remain inactive. If True or False/True, the rule 120 will remain active, or be activated.

Reduction of the relational operators depends on comparisons of the range values returned by the reduce method of a Relational rule function's two ScalarFunction components. Given two range values, there are six cases of comparison that are significant to relational operators. Table 1 shows the result of static reduction for each of the Relational rule function classes, for each of the cases above. 'T' and 'F' mean that the function can be reduced to "true" and "false," respectively; 'F/T' indicates that the function cannot be reduced.

TABLE I

STEDE SPATIAL FUNCTIONS AND THEIR EVALUATION AND REDUCTION SIGNATURES.

| Function | Description | Evaluation signature | Reduction signature |
|---|---|---|---|
| containedInPolygon | Returns true iff the given point input is contained in the given Polygon resource r. | Point p X Polygon r --> Boolean | PointRange p X Polygon r --> BooleanRange |
| containedInPolygonSet | Returns true iff the given point input is contained in any one or more of the given set of Polygons rs. Also returns the subset of Polygons that contain the point. | Point p X PolygonSet rs --> Boolean X List(r) | PointRange p X PolygonSet rs --> BooleanRange |
| inProximityOfPoint | Returns true iff the given point input is within the given distance of the given point r. | Point p X Point r X Scalar d --> Boolean | PointRange p X Point r X Scalar d --> BooleanRange |
| inProximityOfPointSet | Returns true iff the given point input is within the given distance of any of the the given set of points rs. Also returns the subset of points the given point is within the given distance of. | Point p X PointSet rs X Scalar d --> Boolean X List(r) | PointRange p X PointSet rs X Scalar d --> BooleanRange |
| distanceFromPoint | Returns the distance the given point input is from the given point r. | Point p X Point r --> Scalar | PointRange p X Point r --> ScalarRange X Point |

TABLE II

TRUTH TABLE FOR BOOLEANRANGE VALUES.

| X | Y | X AND Y | X OR Y | NOT Y |
|---|---|---|---|---|
| F | F/T | F | F/T | F/T |
| T | F/T | F/T | T | |
| F/T | F/T | F/T | F/T | |

TABLE III

CASES FOR SCALARRANGE OPERATIONS.

| Case | Symbol |
|---|---|
| The left range is wholly less than the right range. | RANGELT |
| The upper end of the left range is equal to the lower end of the right range. | RANGELE |
| The two ranges have a non-zero overlap. | OVERLAP |
| Both ranges consist of single points, and are equal. | EQPTS |
| The lower end of the left range is equal to the upper end of the right range. | RANGEGE |
| The left range is wholly greater than the right range. | RANGEGT |

TABLE IV

DEFINITIONS FOR RELATIONAL OPERATORS ON SCALARRANGE VALUES.

| | Case | | | | | |
|---|---|---|---|---|---|---|
| | LT | LE | EQ | NE | GE | GT |
| RANGELT | T | T | F | T | F | F |
| RANGELE | F/T | T | F/T | F/T | F/T | F |
| OVERLAP | F/T | F/T | F/T | F/T | F/T | F/T |
| EQPTS | F | T | T | F | T | F |
| RANGEGE | F | F/T | F/T | F/T | T | F/T |
| RANGEGT | F | F | F | T | T | T |

Rule Resource Replication/Distribution

Simple rules 120 may require only parameter values that are embedded in the rule 120 itself. More complex rules 120, however, should be able to refer to data that is persistent, and are managed outside the rules 120. The data may be referred to by multiple rules 120, and may be updated by processes outside the rule 120 or rule engine. "Rule resources" are general-purpose storage locations for data. Some additional support is provided for those resources which are used in spatial functions, such as geometric points and polygons.

For these resources, the notion of resource sets are supported, to enable such functions as "containedInPolygonSet." Rule resources give much more flexibility to rules 120 and enable rule programmers to write rules 120 with respect to the resource, but not be concerned with managing the lifetime of the resource.

The distributed STEDE system 400 also supports rule resources that are associated with individual entities. This enables applications to maintain rule-accessible states for individual entities. For example, a rule 120 may wish to record the time of each vehicle's entrance to a particular geographical area so that it can determine the total time the vehicle spent in the area.

Due to limitation on memories in embedded clients 125, the clients 125 often may not have all rule resources covering wide regions. Therefore, the client 125 needs to maintain as little amount of rule resources in its memory as possible, which requires rule resources to be replicated to clients 125 based on their position and time. The rule resource replication/distribution method of a distributed STEDE architecture is described below.

Determining which resources should be in place on a particular client 125 is determined by returning additional information from the rule activation/deactivation process, as follows.

1) Referring to step #2 in the section entitled "Per-Client Rule Activation/Deactivation": Some functions take a resource reference, or resource-set reference, as a parameter (e.g., containedInPolygon (Point p, Polygon r), where r is a reference to a Polygon resource). When the reduced version of such functions are evaluated, if the result is True or Either, the reference value is attached to the Range result. Those functions that also return (through an in/out parameter) a list of resource references for which the function is true, also return this list through their Range results.

2) Referring to step #3 in the section entitled "Per-Client Rule Activation/Deactivation": The return type of the reduction signatures of the logical operators includes the resource references of the BooleanRange inputs when the result is True or Either.

3) Referring to step #4 in the section entitled "Per-Client Rule Activation/Deactivation": For the relational operators, all resource references attached to the inputs are attached to the output when the result is True or Either.

With these addenda, running the rule activation/deactivation process will yield the sets of rule resources that must be present on the client 125 for the time window given to the process. The replica management actions are derived from these by computing the set difference between the process results and the resource sets that were computed the last time the process ran.

Rule resources may be updated, added, or deleted at any time by service providers. Since these actions may cause rules 120 to be activated or deactivated, the rule activation/deactivation process is run whenever any of these actions are performed.

Rule Reduction Process

In one exemplary embodiment, the Rule Reduction Process comprises the following steps:

1. Represent a rule's condition expression as a tree, where each operator or function in the expression is a node in the tree, and where rule inputs, rule resources, and constants are the leaves of the tree.

2. Using domain knowledge as described above, determine a Range value for each input.

3. Beginning with the root operator or function of the tree, evaluate the reduction of the operator/function by first evaluating the reduction of its inputs, then itself, according to the definitions in Tables I, II, and III. This will result in each node of the expression tree being reduced.

4. The result of the process is the reduction of the root node.

System Implementation

Figure 6:
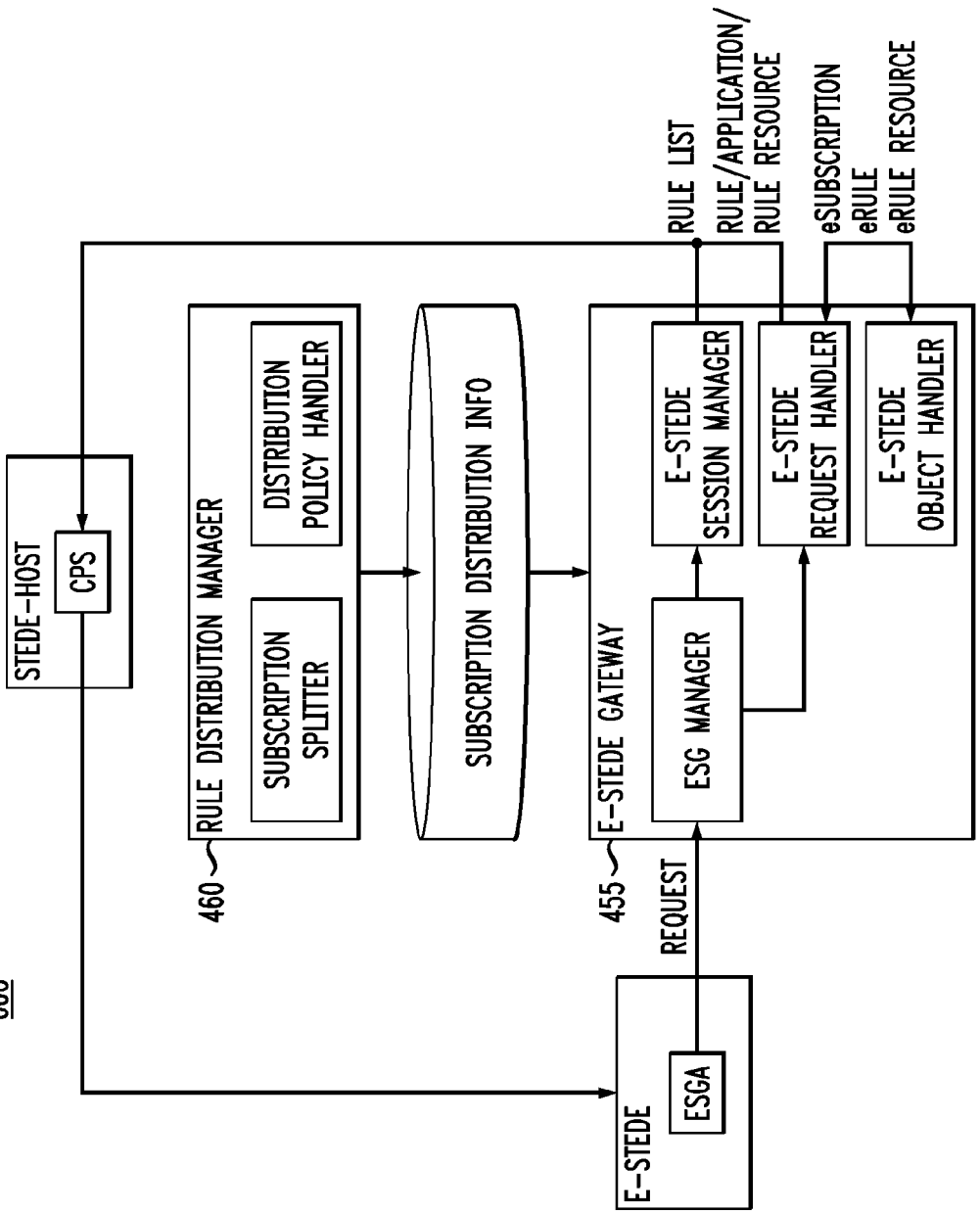
FIG. 6 is a block diagram of the high-level architecture of the server-side of the e-STEDE system.

FIG. 6 is a block diagram of the high-level architecture of the server-side of the distributed STEDE system 400. The e-STEDE Gateway (ESG) 455 keeps the session information of each client 125 in its runtime memory, and uses that in managing the subscriptions, rules 120 and resources for clients 125. Communication between the ESG 455 and clients 125 is flexible, including use of the TOPAZ Content Push Service (CPS).

Rule Distribution Manager (RDM) 460 runs when a subscription is deployed into the distributed STEDE system 400. The RDM 460 runs the process described in the section entitled "Per-Client Rule Activation/Deactivation" and performs the resulting rule distribution. The results are also recorded in a database, to be later used by the ESG 455.

Figure 7:
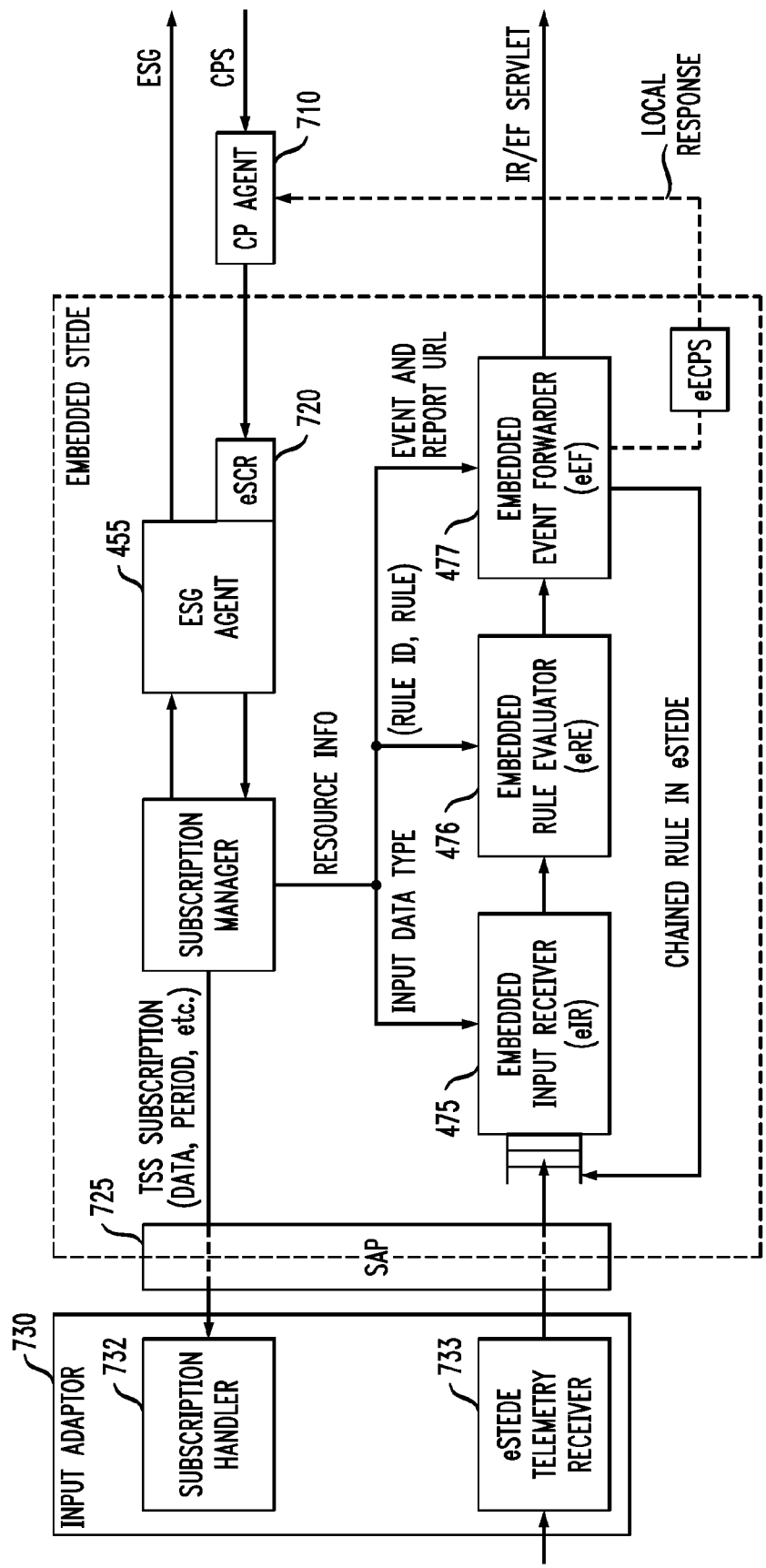
FIG. 7 is a block diagram of the high-level architecture of the e-STEDE client.

FIG. 7 is a block diagram of the high-level architecture of the e-STEDE client 125. The Embedded STEDE Gateway Agent (ESGA) 450 communicates with the Embedded STEDE Gateway (ESG) 455 in the Rule Evaluation Server 170. The ESGA 455 requests a list of rules 120 to be evaluated in the distributed e-STEDE system 400 at start-up. The Embedded Rule Subscription Manager (E-RSM) 472 receives resources from ESGA 455 and sends appropriate information to e-IR 475, e-RE 476, and e-EF 477, such as rules 120 for evaluation, types of input data for the rules 120, and URL(s) of the reports when rules 120 are triggered.

Rules 120 are submitted as rule "subscriptions," which include a rule 120, or a reference to an already submitted rule 120, as well as directives about event forwarding. The subscription information is pushed using the TOPAZ Content Push Service by the ESG 455 running on the server-side.

Upon receiving a rule subscription, the e-RSM 470:

1) Provides subscription information for the Input Adapter;
2) Deploys the rule 120 to the e-RE 476; and
3) Deploys the rule subscription data to the Embedded Event Forwarder 490.

The Embedded Rule Evaluator (e-RE) 476 manages a set of rules 120 to be evaluated. Upon receiving input data from embedded Input Receiver (e-IR) 475, e-RE 476 determines the subset of rules 120 requiring the input data and invokes a rule engine to evaluate them. If a rule 120 'triggers' (returns true), an event notification 160 containing the triggering inputs and any side-effect data computed by the rule 120 are sent to the e-EF 477. In the exemplary distributed STEDE system 400, the AMiT rule engine is utilized to support rule evaluation. (For a detailed description of the AMiT rule engine, see, for example, Adi, A. and Etzion, O., The Situation Manager Rule Language. In Proceedings of the International Workshop on Rule Markup Languages for Business Rules on the Semantic We, June, 2000, incorporated by reference herein.) Embedded Event Forwarder (e-EF) 477 receives rule-triggered event notifications 160 from embedded Rule Evaluator 476 and forwards them to a destination as specified by the associated rule subscription. Rule-triggered event notifications 160 may be forwarded to a Rule Evaluation Server 170, or to on-board applications 150 through a Content Push Agent.

The Embedded STEDE Content Receiver (e-SCR) 720 receives rule resources from the Content Push Agent 710 outside e-STEDE. The Content Push Agent 710 receives resources from a server or the e-EF 477. E-SCR 720 provides an interface between CPA 710 and the distributed STEDE system 400. CPA 710 can make use of functions exposed and defined by e-SCR 720 to provide rule resources to the distributed STEDE system 400.

Service Access Point (SAP) 725 for Input Adaptor (IA) 730 bridges the variety of data sources and their interfaces in a particular environment to a uniform interface required by the e-IR 475. The distributed STEDE system 400 provides a customizable module, Input Adapter 730.

It is assumed that the IA 730 has two modules: Subscription Handler 732 and e-STEDE Telemetry Receiver 733. Subscription Handler 732 receives information of each subscription, such as reporting period and data types. Using the specified period, e-STEDE Telemetry Receiver 733 reports data in the form of the specified data types. It is IA's 730 responsibility to adapt data sources' period to the subscription's requested period, and data sources' data type to the subscription's requested data type.

SAP for IA 730 provides an interface between IA 730 and the distributed STEDE system 400. The implementer of IA 730, possibly a software developer of the embedded device 125 which the distributed STEDE system 400 will run on, should make use of the functions defined in SAP. SAP for IA 730 defines external functions that can be invoked from other applications 150. There are functions to get subscription information and to put data into e-IR 475.

When the distributed STEDE system 400 is started, it sends a setup request to a known server. The server sends a list of rule IDs the device 125 needs to have. If the distributed STEDE system 400 has persistent storage for rules 120 and resources, the distributed STEDE system 400 compares the list with its stored rule IDs, and determines which rules 120 should be downloaded. The rules 120 not in the list are deleted from the file system. The rules 120 in the list but not found in its persistent storage are marked missed; otherwise, the comparison procedure is skipped and all the rules 120 in the list are assumed to be missed. The distributed STEDE system 400 requests the missing rules 120 by sending a request message.

If ESGA 450 gets a resource file for rule ID which the distributed STEDE system 400 does not have, it sends a request for the rule 120 to ESG 455. Upon receipt of the request, ESG 455 pushes the SAR file of the rule ID. ESGA 455 does not need to send an ACK for the first push because it will be re-sent by ESG 455. If there is no response from the distributed STEDE system 400, ESG 455 will make a predetermined number of re-attempts before marking the client inactive. Since embedded devices 125 are often powered off without notice, a setup request not in the protocol sequence is assumed as a device restart. The server will follow the start-up procedure, regardless of the current communication status with the device 125.

It is to be understood that the embodiments and variations shown and described herein are merely illustrative of the principles of this invention and that various modifications may be implemented by those skilled in the art without departing from the scope and spirit of the invention.

We claim:

1. A method for identifying a candidate set of rules, comprising the steps of:

identifying one or more rules that receive information from one or more sensors to create a first candidate set of rules;

evaluating each of said identified rules to identify an initial candidate set of rules, wherein a rule is added to said initial candidate set if a selected device is associated with sensors that are enabled to produce information for said rule being evaluated, if said selected device is enabled to locally provide input information required by said rule being evaluated, and if said rule being evaluated is associated with a group of devices and there are no correlation operators that consume events generated from other devices in said group of devices; and evaluating each rule in said initial candidate set to identify a final candidate set of rules, wherein any rule that receives information from said rule being evaluated is added to said initial candidate set to create said final candidate set if said selected device is enabled to locally satisfy input information required by said rule that receives information and if said rule that receives information is associated with a group of devices and there are no correlation operators that consume events generated from other devices in said group of devices.

2. The method of claim 1, wherein one or more of said rules employ spatial functions and event correlation operators.

3. The method of claim 1, wherein said method is performed for each device in a group of devices.

4. The method of claim 1, further comprising the steps of:

(1) performing a resource usage analysis on said final candidate set of rules to determine a cost of evaluating a rule in terms of processor capacity of rule resources;

(2) comparing said capacity determined by said resource usage analysis and an estimated capacity of a device;

(3) removing one or more rules from said final candidate set to create a candidate set of rules if said capacity determined by said resource usage analysis exceeds said estimated capacity of said device; and repeating steps (1) to (3) until said estimated capacity of said device exceeds said resource usage analysis.

5. The method of claim 4, wherein said capacity is based on CPU usage.

6. The method of claim 4, wherein said capacity is based on storage resources.

7. The method of claim 1, further comprising the steps of replacing one or more downloaded rules with one or more rules of said final candidate set if said one or more rules of said final candidate set have a higher priority than said one or more downloaded rules.

8. A method for deactivating one or more rules on a device for a period of time, comprising the steps of:

estimating one or more ranges of values that will be input to a rule during said finite period of time;

evaluating a rule over at least one of said ranges of values, said evaluation yielding a probability distribution over said values; and deactivating said evaluated rule if said evaluation is false over said range of values.

9. The method of claim 8, further comprising the step of maintaining a subset of rule resources on said device for use by active rules.

10. The method of claim 8, wherein said one or more rules are deactivated if said one or more rules will not trigger during said finite period of time.

11. The method of claim 8, wherein said evaluation produces a set of resources that are required if said evaluation is true over said range of values.

12. An apparatus for identifying a candidate set of rules, the apparatus comprising:

a memory; and at least one processor, coupled to the memory, operative to:

identify one or more rules that receive information from one or more sensors to create a first candidate set of rules;

evaluate each of said identified rules to identify an initial candidate set of rules, wherein a rule is added to said initial candidate set if a selected device is associated with sensors that are enabled to produce information for said rule being evaluated, if said selected device is enabled to locally provide input information required by said rule being evaluated, and if said rule being evaluated is associated with a group of devices and there are no correlation operators that consume events generated from other devices in said group of devices; and evaluate each rule in said initial candidate set to identify a final candidate set of rules, wherein any rule that receives information from said rule being evaluated is added to said initial candidate set to create said final candidate set if said selected device is enabled to locally satisfy input information required by said rule that receives information and if said rule that receives information is associated with a group of devices and there are no correlation operators that consume events generated from other devices in said group of devices.

13. The apparatus of claim 12, wherein one or more of said rules employ spatial functions and event correlation operators.

14. The apparatus of claim 12, wherein said method is performed for each device in a group of devices.

15. The apparatus of claim 12, wherein said processor is further operative to:

(1) perform a resource usage analysis on said final candidate set of rules to determine a cost of evaluating a rule in terms of processor capacity of rule resources;

(2) compare said capacity determined by said resource usage analysis and an estimated capacity of a device;

(3) remove one or more rules from said final candidate set to create a candidate set of rules if said capacity determined by said resource usage analysis exceeds said estimated capacity of said device; and repeat steps (1) to (3) until said estimated capacity of said device exceeds said resource usage analysis.

16. The apparatus of claim 12, wherein said processor is further operative to replace one or more downloaded rules with one or more rules of said final candidate set if said one or more rules of said final candidate set have a higher priority than said one or more downloaded rules.

17. An apparatus for deactivating one or more rules on a device for a period of time, the apparatus comprising:

a memory; and at least one processor, coupled to the memory, operative to:

estimate one or more ranges of values that will be input to a rule during said finite period of time;

evaluate a rule over at least one of said ranges of values, said evaluation yielding a probability distribution over said values; and deactivate said evaluated rule if said evaluation is false over said range of values.

18. The apparatus of claim 17, wherein said one or more rules are deactivated if said one or more rules will not trigger during said finite period of time.

19. The apparatus of claim 17, wherein said evaluation produces a set of resources that are required if said evaluation is true over said range of values.

* * * * *